United States Patent [19]

Minamida et al.

[11] Patent Number: 5,116,688
[45] Date of Patent: May 26, 1992

[54] CORE STRIP FOR HONEYCOMB CORE PANEL AND METHOD OF PRODUCING THE SAME

[75] Inventors: Katsuhiro Minamida; Atsushi Sugihashi; Motoi Kido, all of Sagamihara, Japan

[73] Assignee: Nippon Steel Corporation, Japan

[21] Appl. No.: 684,641

[22] Filed: Apr. 12, 1991

[30] Foreign Application Priority Data

Apr. 13, 1990 [JP] Japan ................... 2-96373

[51] Int. Cl.$^5$ .................. B32B 3/12; B23K 26/00; B23K 101/02; E04C 2/36
[52] U.S. Cl. ................... 428/582; 428/593; 428/603; 29/897.32; 52/807
[58] Field of Search ............. 428/582, 593, 603; 52/799, 800, 806, 807; 219/121.64, 121.63; 228/181; 72/324; 29/897.32

[56] References Cited

U.S. PATENT DOCUMENTS

| | | | |
|---|---|---|---|
| 2,003,326 | 6/1935 | Wellman | 428/582 |
| 2,910,153 | 10/1959 | Campbell | 428/582 |
| 2,959,257 | 11/1960 | Campbell | 52/806 |
| 2,983,038 | 5/1961 | Johnson | 52/806 |
| 3,538,668 | 11/1970 | Anderson | 52/800 |
| 4,471,013 | 9/1984 | Welzen | 428/593 |
| 4,643,933 | 2/1987 | Picken | 52/806 |
| 4,824,011 | 4/1989 | Maus et al. | 219/121.63 |
| 4,832,999 | 5/1989 | Sweet | 428/593 |
| 4,942,285 | 7/1990 | Ishikawa et al. | 219/121.64 |

FOREIGN PATENT DOCUMENTS

| | | | |
|---|---|---|---|
| 62-47711 | 10/1987 | Japan . | |
| 220666 | 8/1924 | United Kingdom | 52/807 |
| 665850 | 1/1952 | United Kingdom | 52/807 |

OTHER PUBLICATIONS

Metals Handbook, vol. 6, 9th ed., "Welding, Brazing, and Soldering", American Society for Metals, Laser Beam Welding, 1983, pp. 647–671.

*Primary Examiner*—John Zimmerman
*Attorney, Agent, or Firm*—Pollock, Vande Sande & Priddy

[57] ABSTRACT

A core strip for a honeycomb core panel is composed of a metal strip shaped into a corrugated configuration and having continuous alternate convex and concave portions of identical shape, each of the convex portions being defined by a plateau portion and a pair of inclined portions, and each of the concave portions being defined by a bottom portion and the pair of inclined portions. The inclined portions interconnect the plateau portion and the bottom portion. At the one side edge of the shaped metal strip, the plateau portion and the inclined portions have respective first flanges disposed perpendicular to the metal strip and directed away from a convex surface of the convex portion. At the other side edge of the shaped metal strip, the bottom portion and the inclined portion have respective second flanges disposed perpendicularly to the metal strip and directed away from a convex surface of the concave portion. With this construction of the core strip, the core strips can be welded together with high uniformity and high weldability, and the thickness of the core strip can be greater than that of a conventional one. In the formation of a honeycomb core panel, such core strips can facilitate the bonding between a core and face sheets, and also enable a stable bonding.

4 Claims, 9 Drawing Sheets

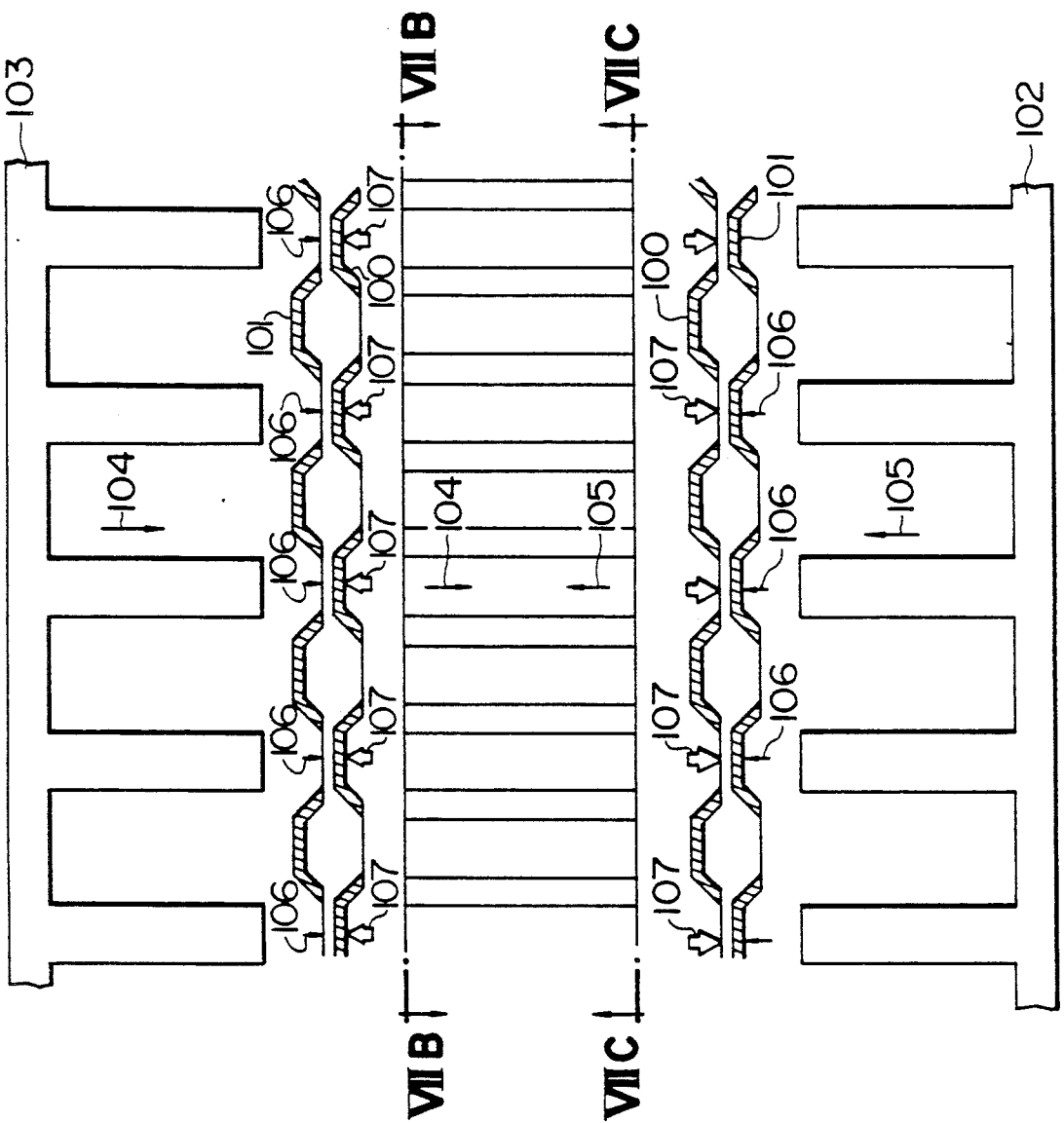

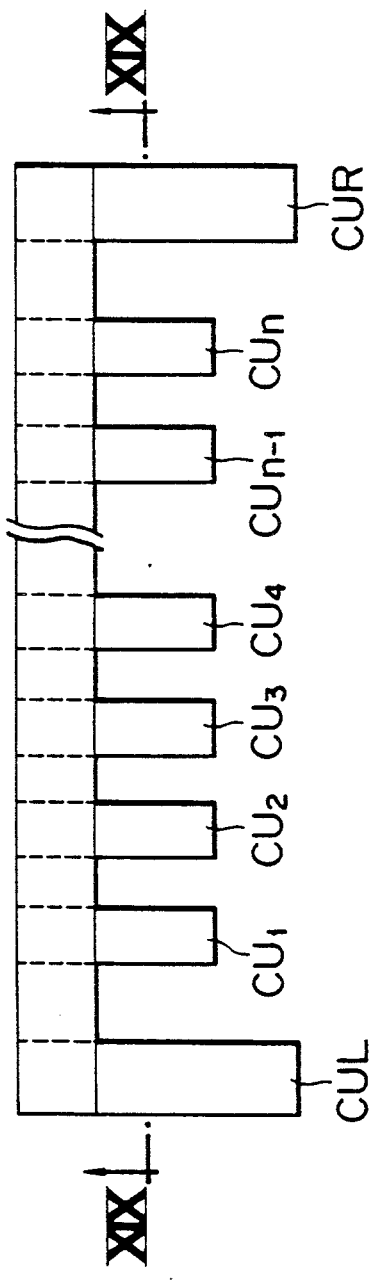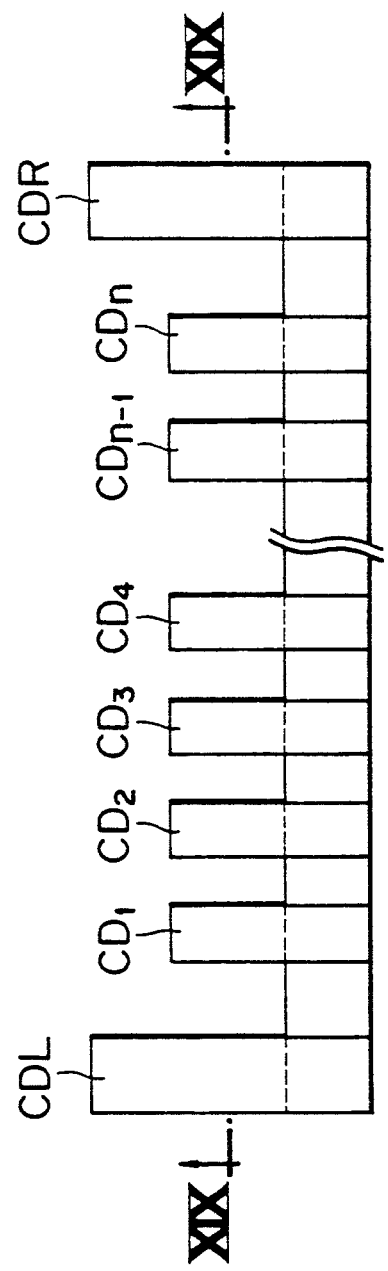
FIG. 18B
FIG. 18A

CORE STRIP FOR HONEYCOMB CORE PANEL AND METHOD OF PRODUCING THE SAME

BACKGROUND OF THE INVENTION

1. Field of the Invention

This invention relates to a honeycomb core panel made of thin sheets of metal such as titanium. Such a panel comprises a honeycomb core placed between a pair of face sheets. Usually, the core is constituted by a plurality of corrugated ribbons or strips which are connected together by welding or the like to form a honeycomb construction. The face sheets are fixedly secured to the side edges of the core strips by welding or diffusion bonding. Such a construction is very lightweight and is extremely sturdy. The panel of this type is used usually in an airplane and ship.

2. Description of the Prior Art

To facilitate the welding of the face sheet to the honeycomb core, each of the core strips constituting the core has a flange formed on each of the opposite side edges thereof. These flanges are integral with the core strip, and are formed during the time when the corrugated core strip is formed from a metal strip serving as a flat plate by punching. The flange is formed by bending the side edge of the core strip so that the flange is corrugated in perpendicularly with respect to the core strip. The core strip has valley portions and plateau portions. The above bending operation causes wrinkles at the valley portions of the flange member. In the formation of the honeycomb core, the core strips are arranged in such a manner that the flanges of each core strip overlap the flanges of its adjacent core strip, respectively, thereby providing a honeycomb configuration. Generally, the flange assumes a "joggle" condition (that is, a slightly inwardly bent condition) at each valley portion of the strip, thereby facilitating the honeycomb formation. That portion of the flange disposed at the plateau portion of the core strip slides over that portion of the flange disposed at the valley portion of its adjacent core strip. By doing so, the flanges jointly provide sufficient flat surfaces to enable the face sheet to be fixedly secured thereto. Such a core strip and a method of producing the same are disclosed in Japanese Patent Examined Publication No. 62-47711.

In the above prior art, the flanges are bent in the same direction at the opposite side edges of all of the core strips. Therefore, while welding the uppermost core strip and its adjacent core strip together, wrinkles are present in a concentrated manner at those portions of the flanges disposed at the valley portions or the plateau portions, so that the thickness of the overlapped flanges is more than twice the thickness of the flange. Therefore, it is difficult to bond the face sheet uniformly to the core strips at a later stage. This particularly limits a demand for an increased thickness of the core strip. Thus, the conventional core strips could not be increased in thickness.

SUMMARY OF THE INVENTION

With the above problems of the prior art in view, it is an object of this invention to provide a core strip for a honeycomb core panel which enables the welding between the core strips to have high uniformity and good weldability, and also enables the core strip to have a greater thickness than the conventional core strips, thereby facilitating the bonding of face sheets to a honeycomb core at a later stage.

Another object of the invention is to provide a method of producing a honeycomb core panel comprising such core strips.

According to the present invention, a core strip is shaped into a corrugated configuration without overlapping wrinkled portions, and the edge portions of the core strip are formed into flanges by wipering. The flanges on one side edge of the core strip and the flanges on the other side edge thereof are bent in opposite directions, and further the flanges are formed intermittently on the side edge, so that the flanges exist on one of the opposite side edges at the plateau portion and the bottom portion when welding the overlapped portions of the core strips. The insertion and removal of a welding fixing jig are facilitated and made stable at a high speed during the welding between the core strips, and the uniform, flawless welding is enabled. By providing notches in the flanges, the wrinkling or a stepped shape due to the overlapping of the flanges are eliminated, and the increased width of the flange is provided. A V-shaped narrow gap portion is formed at the bonding surface between the flange and a face sheet, and a laser beam is applied to this narrow gap portion, the laser beam being made convergent by a mirror reflection by the flange and the face sheet. As a result, the laser beam is subjected to multiple reflection within the narrow gap portion so as to be convergent, so that the face sheet and the flange can be continuously welded together. This welding method obviates the need for positioning control required by the conventional method, and enables a high-speed flawless welding, thereby providing the honeycomb panel of high strength.

The invention will now be described specifically with reference to the drawings.

FIG. 6A is a view showing one example of core strip according to the present invention. This core strip is in the form of a shaped metal strip of a corrugated configuration which has continuous alternate convex and concave portions of identical shape. Each convex portion is defined by a plateau portion A and inclined portions B and D, and each concave portion is defined by a bottom portion C and the inclined portions B and D, and the inclined portions B and D interconnect the plateau portion A and the bottom portion C. At one side edge (upper side edge in FIG. 6A) of the shaped metal strip, the plateau portion A and the inclined portions D and B (which are disposed respectively on the opposite sides of the plateau portion A) have respective flanges disposed perpendicular to the metal strip and directed inwardly from the convex surface of the convex portion. At the other side edge (lower side edge in FIG. 6A) of the shaped metal strip, the bottom portion C and the inclined portions B and D (which are disposed respectively on the opposite sides of the bottom portion C) have respective flanges disposed perpendicular to the metal strip and directed inwardly from the convex surface of the concave portion as denoted by numerals 32 and 33.

FIG. 6B illustrates a method of producing the core strip according to the present invention, which will be described hereinafter. First, as shown in FIG. 6B, notches are formed in the opposite side edge of a flat metal strip to provide flanges. Then, the flanges 30 and 31 formed by notches on one side edge (upper side edge in FIG. 6B) are bent upwardly in a direction perpendicular to the sheet of FIG. 6B along a broken line, and the flanges 32 and 33 formed by notches on the other side edge (lower side edge in FIG. 6B) of the metal strip are bent in the direction opposite to the flanges 30 and 31, that is, downwardly in a direction perpendicular to the sheet of FIG. 6B along a broken line. Then, the metal strip is bent along dot-and-dash lines into the corrugated configuration shown in FIG. 6A. In this example, the notches are formed, and then the flanges formed be bending along lines formed by the notches. Finally, the metal strip is shaped into the corrugated configuration by bending. However, the honeycomb core strip of the present invention can be produced by changing the order of the notch formation step, the flange bending step and the corrugation step. Also, the honeycomb core strip of the present invention can be produced, using an apparatus for carrying out these steps at the same time.

FIGS. 7A to 7E are illustrations of a method of forming the honeycomb core. FIG. 7A is a plan view of two comb core strips 100 and 101 overlapping each other, with their corrugations displaced with respect to each other. FIG. 7B is a side-elevational view as seen from the line VIIB—VIIB of FIG. 7A. FIG. 7C is a side-elevational view as seen from the line VIIC—VIIC of FIG. 7A. In the honeycomb core of the present invention, the overlapped portions of the core strips 100 and 101 are welded together. FIG. 7E shows an upper fixing jig 102 for pressing the overlapped portions downwardly during the welding FIG. 7D shows a lower fixing jig 103 for pressing the overlapped portions upwardly during the welding.

The flanges of the strip 100 on the upper side exist at the VIIB—VIIB line side of the overlapped portions of the overlapped strips, and therefore the fixing jig 103 can not be inserted. However, there is no flange on the strip 101 on the lower side, and therefore the fixing jig 103 can be inserted. Therefore, the lower fixing jig 103 is inserted from the lower side along the overlapped surface of the core strip 101 having no flange in a direction of arrow 104 so as to press the overlapped portions upward from the lower side as indicated by arrow 106.

The flanges of the strip 101 on the lower side exist at the VIIC—VIIC line side of the overlapped portions of the overlapped strips, and therefore the upper fixing jig 102 can not be inserted. However, since there is no flange on the strip 100 on the upper side, and the fixing jig 102 is inserted along the overlapped surface of the core strip 100 having no flange in a direction of arrow 105 so as to press the overlapped portions downward as indicated by arrow 107.

The overlapped portions are pressed in the directions of arrows 106 and 107, and are held in close contact with each other. Therefore, the overlapped portions can be easily welded together in a sound manner. A concrete welding method will be described later in the description of preferred embodiments.

Using the method described in FIGS. 7A-7E, other core strips is further overlapped, and the overlapped portions are welded. This procedure is repeated to overlap a number of core strips to thereby form a honeycomb. Thus, the honeycomb core in which the overlapped portions are welded together in a reliable manner can be produced. In this honeycomb, a number of flanges are formed around the peripheries of the holes of the honeycomb at both the VIIB—VIIB line side and the VIIC—VIIC line side. The face sheets are secured to the flanges by a laser beam. A specific method will be described later in the description of the preferred embodiments.

BRIEF DESCRIPTION OF THE DRAWINGS

FIGS. 7A to 7E are views illustrative of a method of producing the honeycomb core of the present invention; FIG. 7A is a plan view of two honeycomb core strips with their corrugations displaced from each other; FIG. 7B is a side-elevational view as seen from the line VIIB—VIIB; FIG. 7C is a side-elevational view as seen from the line VIIC—VIIC; FIG. D is a cross-sectional view of an upper fixing jig; FIG. 7E is a cross-sectional view of a lower fixing jig;

FIGS. 18A and 18B are plan views showing the manner of fixing a plurality of honeycomb core strips at the same time by fixing jigs; FIG. 18A is a plan view of the lower welding fixing jig; FIG. 18B is a plan view of the upper welding fixing jig;

DETAILED DESCRIPTION OF THE PREFERRED EMBODIMENTS

Preferred embodiments of the present invention will now be described with reference to the drawings. The embodiments described hereafter are presented merely for the purpose of explaining the principles of the present invention, and therefore will not limit the present invention. The scope of the present invention is determined upon making reference to the appended claims.

Figure 1:
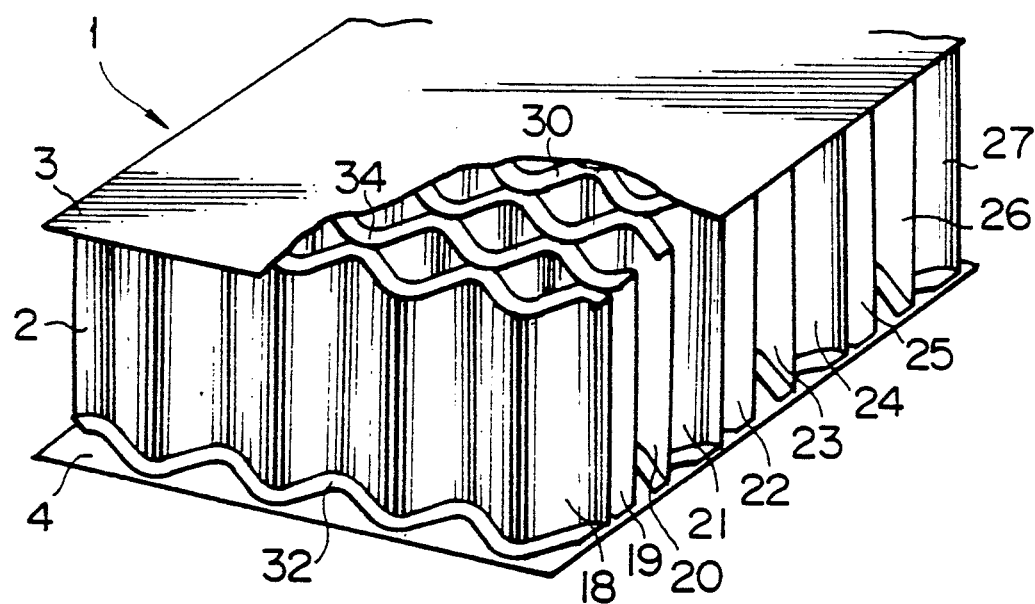
FIG. 1 is a partly broken, perspective view of a honeycomb core.

Referring to FIG. 1, a honeycomb core panel 1 comprises a honeycomb core 2 placed between a pair of face sheets 3 and 4. The honeycomb core 2 is composed of a plurality of comb-like core strips 18 to 27. The core strip is formed by shaping a flat strip into a corrugated configuration by punching or pressing.

Each of the core strips has flanges 30 and 32 formed integrally on its opposite side edges, respectively. The flange 30 as well as the flange 32 provides a flat surface to enable the face sheet to be joined thereto. The core strips are welded together in the longitudinal direction at connecting portions 34, and the face sheets 3 and 4 are connected respectively to the flanges 30 and the flanges 32 by welding.

As already described, the flanges 30 and 32 are integral with the core strip. These flanges are formed during the punching step, and are formed by bending the corrugated core strip by a wiper element disposed close to the punch.

Figure 2:
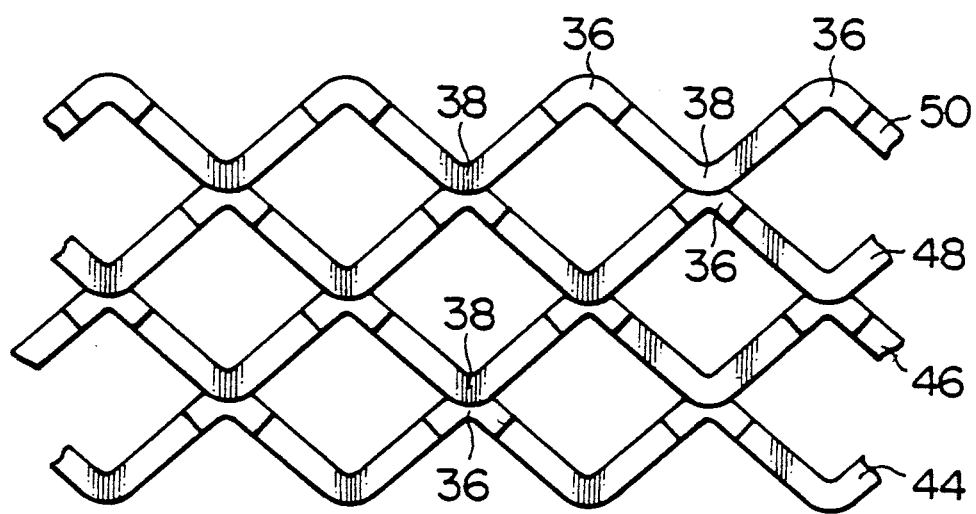
FIG. 2 is a plan view showing the construction of the honeycomb.

FIG. 2 is a plan view of a honeycomb construction comprising four core strips 44, 46, 48 and 50 connected together in a honeycomb manner. In the punching operation, a plurality of connecting portions, valley portions 36 and hill portions 38 are formed. For connecting the core strips, the valley portions 36 of the core strip 44 are connected to the hill portions 38 of the core strip 46, respectively. Since the core strip is made from the flat sheet, the flanges are compressed at the valley portions 36 during the punching and the formation of the flange 30 and 32, and therefore are subjected to formation of wrinkles. In the conventional core strip, such wrinkling is restrained by interposing an additional member during the punching for forming the flange. Further, that portion of the flange in the vicinity of the valley portion 36 is bent inwardly toward the opposite flange, thus causing a so-called "joggling" condition. Therefore, the hill portion 38 of the flange of the adjacent core strip slides over and is connected to the valley portion 36. This joggling causes all the flanges to be disposed substantially in a common plane, and this facilitates the connection of the face sheet thereto.

Figure 3:
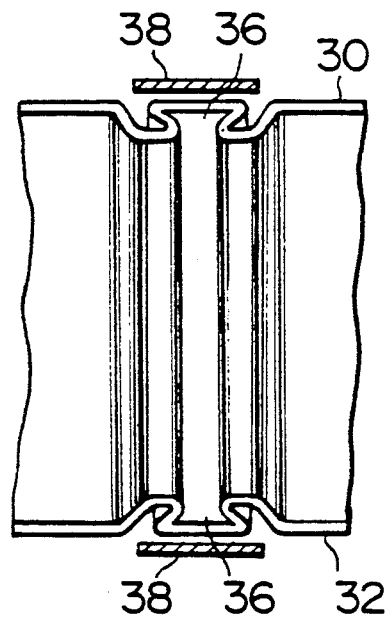
FIGS. 3 and 4 are views showing the condition of overlapping of flanges of conventional core strips.
Figure 4:
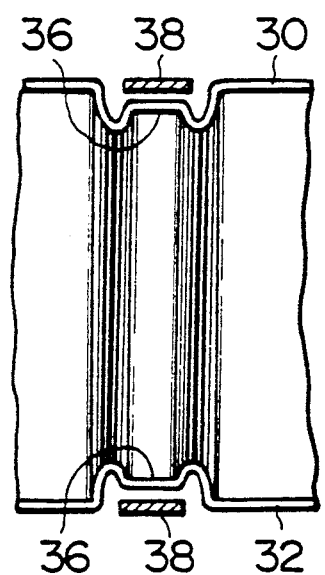

FIGS. 3 and 4 are front-elevational views of a portion of a core strip in conventional methods, showing the condition of overlapping of flanges 30, 32 at a valley portion 36 and the overlapping condition at the next hill portion 38.

Figure 5:
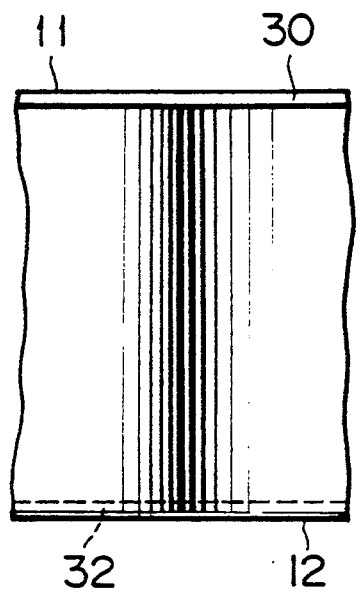
FIG. 5 is a view showing a flange of the present invention corresponding to the flange of FIG. 3.

FIG. 5 is a front-elevational view of a portion of the core strip of the present invention, and the overlapping between the valley portion 36 and the hill portion 38 of the flanges provided in FIGS. 3 and 4 is not present in the connection of the core strips.

The core strip is made of a metal material such as titanium and stainless steel. As shown in FIG. 3, the flange thickness becomes three times at the valley portion 36, and therefore the thickness of the material for this core strip is limited to 5 mil (127 $\mu$m) at the maximum when the longitudinal and transverse diameters of each hole of the honeycomb is $\frac{1}{4}$inch (6.4 mm). Further, the joggling operation at the valley portion is done during the punching step, and can not be controlled to a point close to the intersection.

Also, in the conventional method of FIG. 4, the joggle at the valley portion and the three-times thick portion are not formed, and instead the excess portions resulting from the wrinkling are projected toward the inside of the core strip, that is, away from the outer surface of the flange, so as to eliminate the three-times thick portion shown in FIG. 3. However, the thickness of the overlapped flanges is still twice, thus limiting the thickness of the core strip to be used. Thus, the overlapping of the flanges by the connection of the core strips in the conventional methods of FIGS. 3 and 4 causes a non-uniform surface, and it is difficult to provide a flat surface for enabling the face sheet to be connected thereto.

Figure 6A:
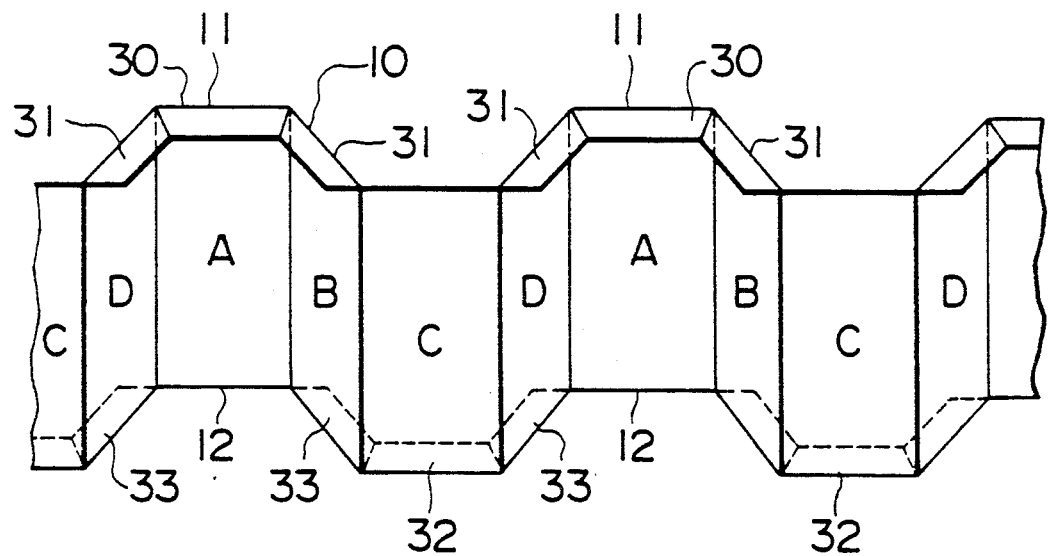
FIG. 6A is a perspective view of a core strip of the present invention.
Figure 6B:
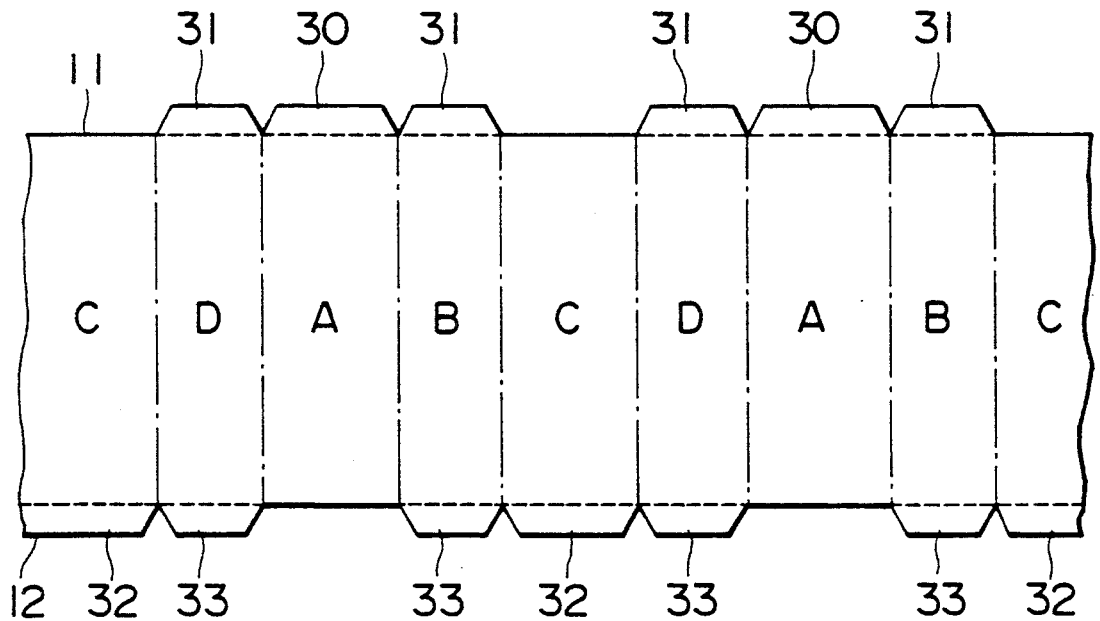
FIG. 6B is a developed view of the core strip of FIG. 6A.

FIG. 6A is a perspective view of the core strip, obtained after the pouncing and pressing operations, of the present invention. FIG. 6B is a developed view of the core strip of FIG. 6A. Flanges 30 and 31 and flanges 32 and 33 are intermittently formed respectively on opposite side edges 11 and 12 of the core strip 10 by punching and pressing. When, at one side edge 11 of the core strip 10, the flange 30 is formed on the plateau portion A of the trapezoidal portion of the core strip, no flange is formed on the bottom portion C. On the other hand, the reverse is the case with the other side edge 12, and when the flange 32 is formed on the bottom portion C, no flange is formed on the plateau portion A. Flanges 31 and 33 are formed on all inclined portions B and D at the opposite side edges 11 and 12. In the pressing operation for forming the corrugated core strip, the flange 30 and the flanges 31, formed respectively on the plateau portion A and the inclined portions B and D at the upper side edge of the core strip, are bent away from the convex surface of the trapezoidal portion to form a flat surface. Similarly, the flanges 32 and 33, formed respectively on the bottom portion C and the inclined portions B and D at the lower side edge of the core strip, are bent away from the convex surface of the trapezoidal portion to form a flat surface.

Figure 8:
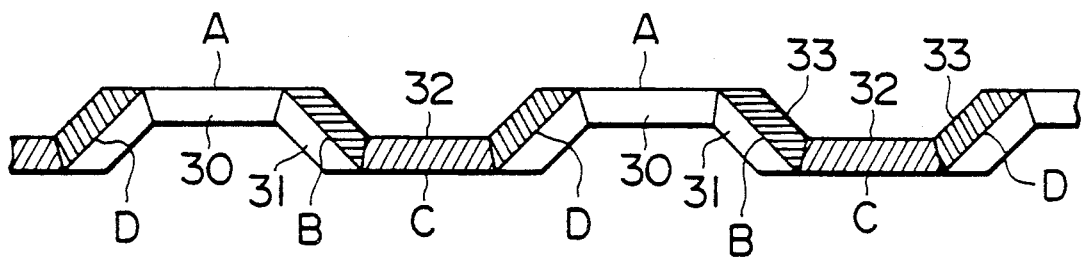
FIG. 8 is a top plan view of a core strip of the present invention.

FIG. 8 is a top plan view of the corrugated core strip 10 of FIG. 6. The flange 30 on each plateau portion A and the inclined flanges 31, disposed respectively on the opposite sides thereof, are bent toward the lower side, and the flange 32 on each bottom portion C and the inclined flanges 33, disposed respectively on the opposite sides thereof, are bent toward the upper side. Thus, these flanges provide flat surfaces having no wrinkle which would develop in flanges of the conventional core strip. Either of the upper side or the lower side of a cross-sectional plane through the honeycomb construction formed by these core strips has no flange and this facilitates and makes fast the insertion and removal of a welding fixing jig when welding the core strips together.

Figure 9:
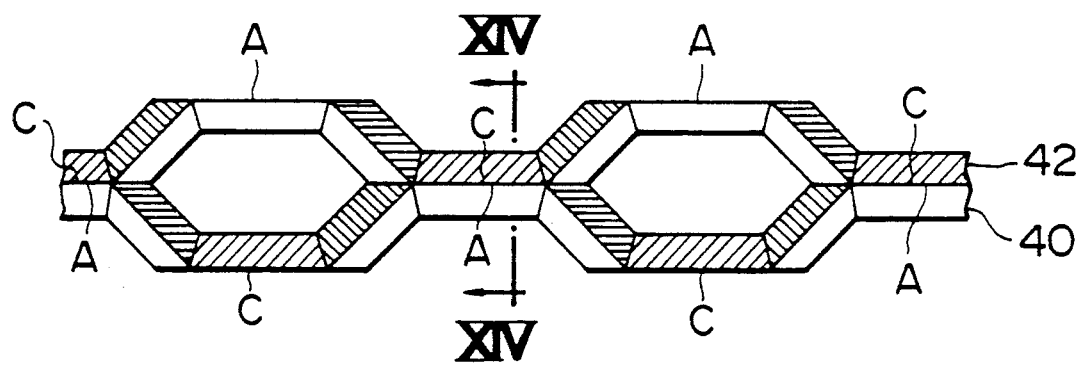
FIG. 9 is a top plan view of a pair of core strips of the present invention combined together.

FIG. 9 shows the condition of bonding between core strips 40 and 42. The bottom portions C of the upper strip 42 are disposed in registry with the plateau portions A of the lower core strip 40, respectively, thereby forming the honeycomb core.

Figure 10:
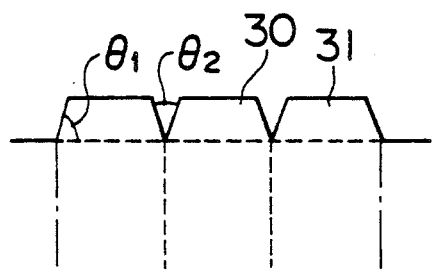
FIGS. 10 and 11 are developed views each showing the configuration of the edge of the core strip of the present invention.
Figure 11:
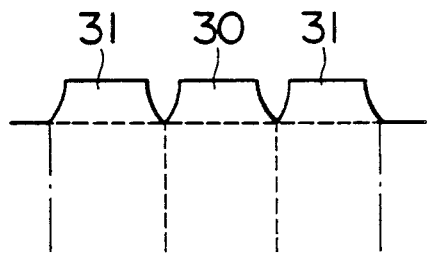

FIGS. 10 and 11 show the shapes of the flanges 30 on the plateau portion of the edges of the core strips (flanges 32 on the bottom portion thereof) and the flanges 31 on the inclined portions (flanges 33 at the side of the bottom portion). In order to eliminate the overlapping of the flanges at the plateau portion or the bottom portion during the bending operation, notches of a V-shape or a U-shape are formed, so that the flanges have a trapezoidal shape. In the case of the V-shaped notch, when each hole of the honeycomb is to be formed into a regular hexagonal shape, angle $\theta 1$ and angle $\theta 2$ are set to 60°. In the case of the U-shaped notch, the angle between the opposite edges of the U-shape set greater as compared with the V-shaped notch.

Figure 12:
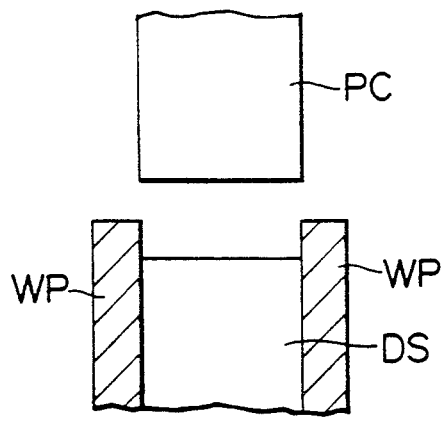
FIG. 12 a front-elevational view showing a method of forming conventional core strip and flange.

FIG. 12 show a punch PC, a die DS and wipers WP used for the corrugated formation of a core strip and the flange formation in a conventional method. The core strip is formed into a corrugated configuration by the punch and the die and the core strip is fixed by the punch and the die, and in this condition the wipers are moved upwardly to form flanges. At this working, wrinkles develop at the valley portions of the corrugation.

Figure 13:
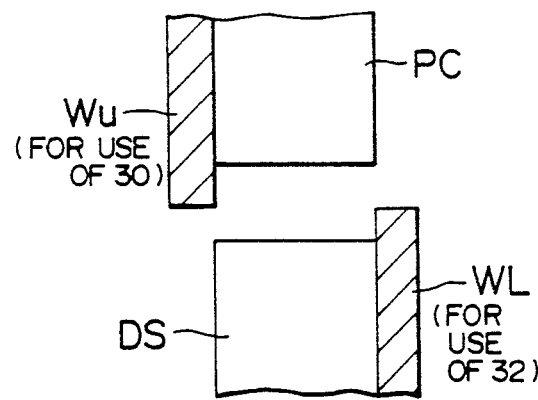
FIG. 13 is a front-elevational view showing a method of forming a core strip and a flange according to the present invention.

FIG. 13 shows the corrugated formation of the core strip and the flange formation according to the present invention. The core strip is formed into the corrugated configuration by a punch PC and a die DS, and in this condition the edge portions are bent downwardly and upwardly respectively by an upper wiper Wu and a lower wiper WL, thereby forming the flanges. A gap corresponding to the thickness of the core strip is formed between the punch PC and the upper wiper Wu, and also a gap corresponding to the thickness of the core strip is formed between the die DS and the lower wiper WL, so that each flange can be easily bent perpendicular to the core strip during the flange formation.

FIGS. 14, 15, 16, 17, 18 and 19 show methods of welding the core strips together according to the present invention.

Figure 14:
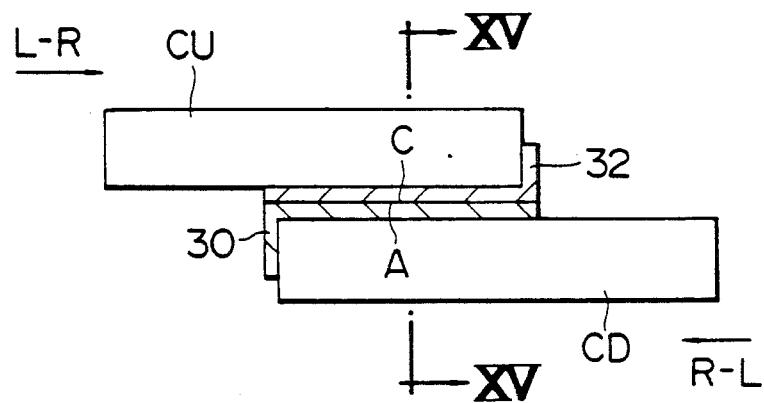
FIG. 14 is a view taken along the line XIV—XIV of FIG. 9, showing fixing jigs for welding the core strips of the present invention together and also a fixing method.

When the plateau portion A of the lower core strip and the bottom portion C of the upper core strip are welded to each other, it is necessary to reduce the gap between these bonding surfaces to an extremely small value. FIG. 14 is a side-elevational view showing such situation. At each side of the plateau and bottom portions, an upper fixing jig CU is inserted in an L-R direction, and a lower fixing jig CD is inserted in R-L direction, so that the plateau portion A and the bottom portion C are held in close contact with each other, thereby ensuring a flawless welding.

Figure 15:
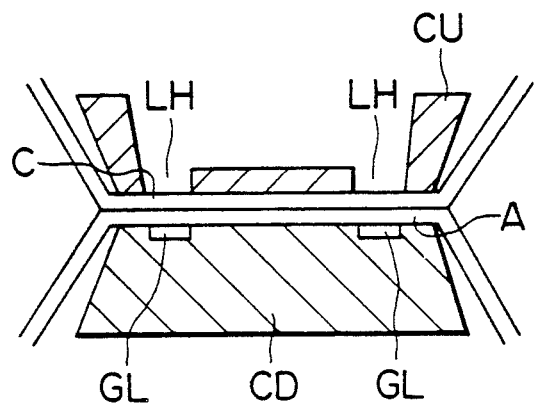
FIG. 15 is a view taken along the line XV—XV of FIG. 14, showing a laser beam welding fixing method using the fixing jigs arranged in two rows for welding the core strips of the present invention together.

FIG. 15 is a cross-sectional view taken along the line XV—XV of FIG. 14, showing upper and lower fixing jigs CU and CD for laser beam two-row welding as well as the plateau portion A and the bottom portion C of the core strips. Laser beam-introducing holes LH are formed in the upper fixing jig CU, and laser beam-introducing holes gaps GL are formed in those portions of the lower fixing jig GL corresponding to weld bead portions. With this arrangement, the core stop and the fixing jigs are not fused together, and the formation of an oxide film on the welding surface can be easily prevented by argon gas or the like.

Figure 16:
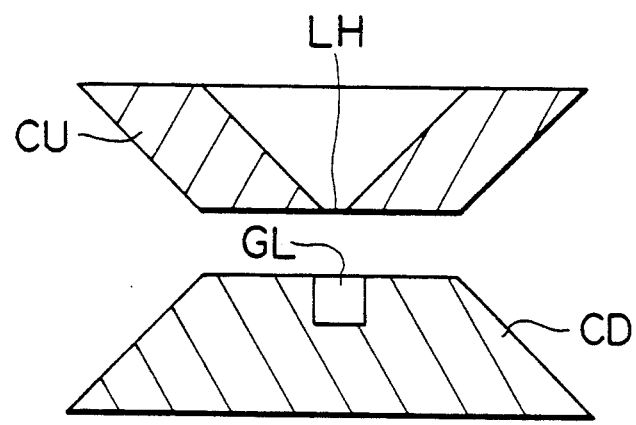
FIG. 16 is a sectional view similar to FIG. 15, but showing fixing jigs for a laser beam one-row welding method of the present invention.

FIG. 16 shows laser beam one-row welding fixing jigs which function in the same manner as the laser beam two-row welding fixing jigs of FIG. 15.

Figure 17:
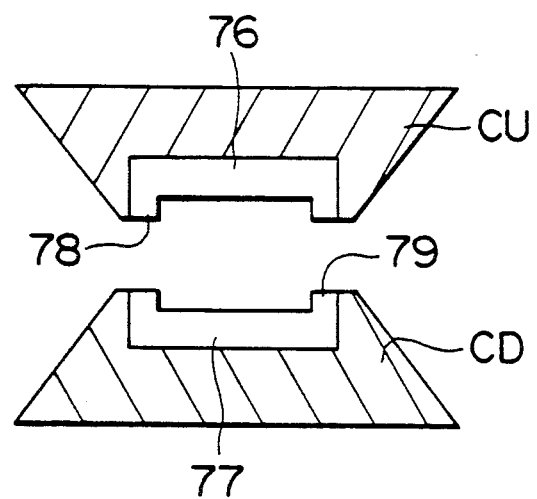
FIG. 17 is a sectional view similar to FIG. 15, but showing fixing jigs for a two-row welding method of the present invention utilizing electric resistance welding.

FIG. 17 shows welding fixing jigs, arranged in two rows, used in an electric resistance welding method. The upper and lower jigs CU and CD comprise respective electrodes 76 and 77 and respective contact tips 78 and 79. With this arrangement, a plurality of weldings between the core strips can be made simultaneously by a plurality of fixing jigs.

FIGS. 18A and 18B show a series of welding fixing jigs mentioned in FIGS. 15 to 17 (the upper jigs indicated by CU1 to CUn; the lower jigs indicated by CD1 to CDn) arranged in accordance with the size of the honeycomb core. FIG. 18A shows a series of the upper welding fixing jigs, and FIGS. 18B shows a series of the lower welding fixing jigs. By upper guide rails CUL and CUR and lower guide rails CDL and CDR for position control, the fixing jigs are positioned accurately with respect to the plateau portions A and the bottom portions C of the core strips, respectively. The upper jigs CU1 to CUn hold the bottom portions C of the upper core strip, respectively, and the lower jigs CD1 to CDn hold the plateau portions A of the lower core strip, respectively, so that the gaps between each mating pair of plateau portion A and bottom portion C is rendered close to zero, thereby enabling a flawless welding. In the present invention, it is only necessary to consider the welding between the uppermost core strip and its adjacent core strip disposed below it, and the accumulation of strains due to the pile-up welding of the core strips is not encountered at all.

Figure 19:
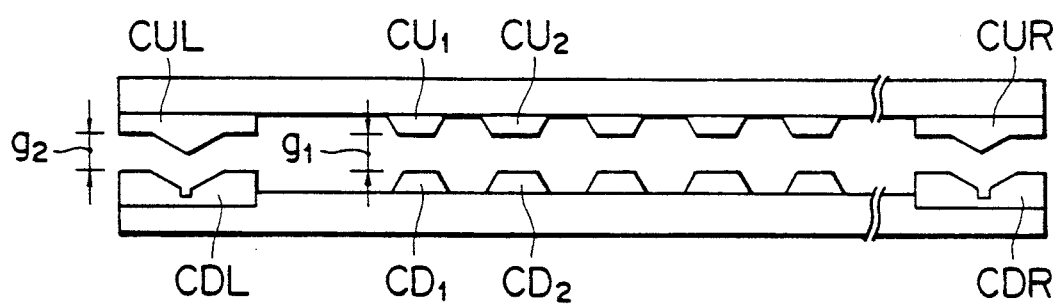
FIG. 19 is a view taken along the line XIX—XIX of FIG. 18.

FIG. 19 is a cross-sectional view taken along the line XIX—XIX of FIGS. 18A and 18B, showing the state of overlapping the welding fixing jigs. The gap g2 between the upper guide rail CUL (CUR) and the lower guide rail CDL (CDR) after the fixing of the core strips is 5 to 10 $\mu$m larger than the gap g1 between the upper welding jig CU1 to CUn and the lower welding jig CD1 to CDn, so that the gap between the welding surfaces is made as small as possible in accordance with the change of the thickness of the core strips and the change of their shape.

Figure 20:
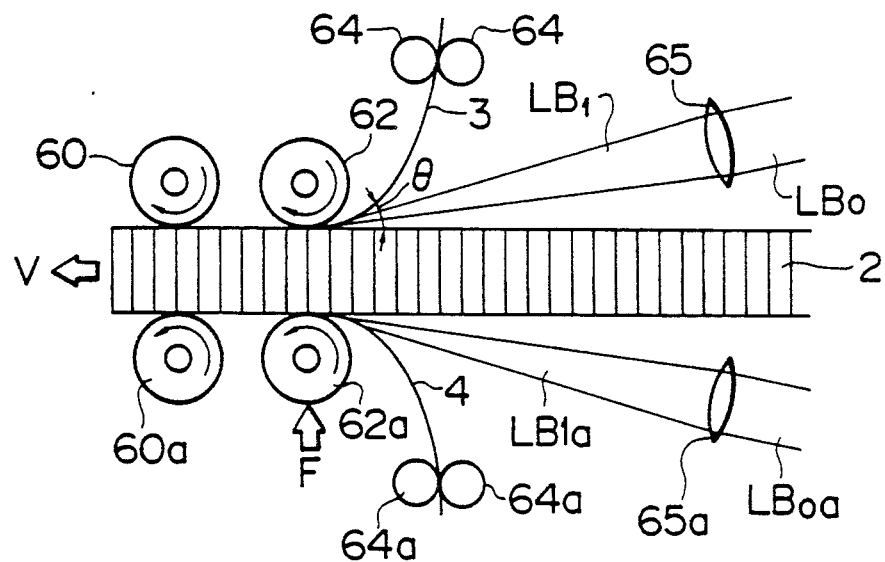
FIG. 20 is a view showing the manner of welding face sheets to the core according to the present invention.

FIG. 20 shows a method of welding the face sheets 3 and 4 to the honeycomb core 2 by a laser beam to form the honeycomb panel 1. The face sheets 3 and 4 are pressed against the honeycomb core 2 under pressure F by squeeze rolls 62 and 62a, and the face sheets 3 and 4 are held at an open angle 8 with respect to the honeycomb core 2 by guide rolls 64 and 64a so as to carry out the welding, so that a narrow gap portion serving as a welding portion is formed between each face sheet and the honeycomb core 2 adjacent to the squeeze roll 62 (62a). A laser beam LBo(LBoa) is condensed by a lens 65 (65a), so that a converging laser beam LB1 (LB1a) is applied to this narrow gap portion.

Figure 21:
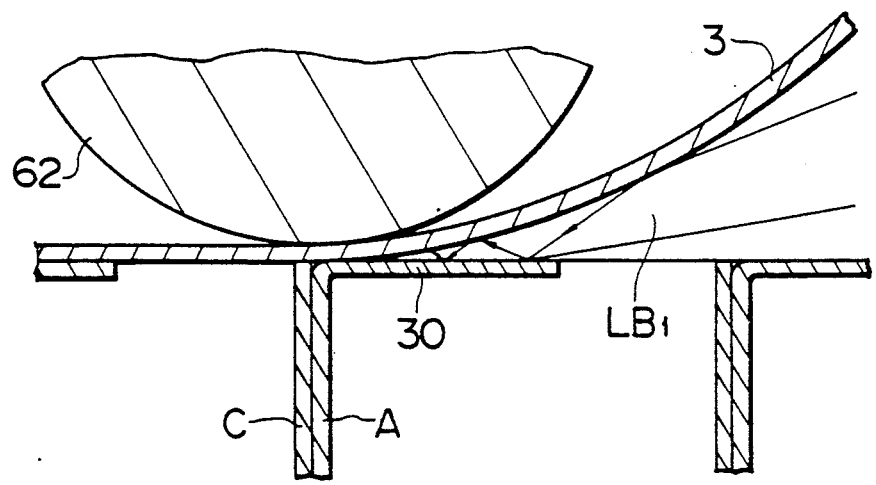
FIG. 21 is an enlarge view of a narrow gap portion of FIG. 20, showing the convergence by multi-reflection of a laser beam and the welding.

FIG. 21 is an enlarged view of the narrow gap portion of FIG. 20. When the laser beam LB1 (LB1a) is applied to the narrow gap portion defined by the face sheet 3 (4) and the flange 30 (31, 32, 33), this laser beam is subjected to multiple reflection at the surface of the face sheet 3 and the surface of the flange 30, and gradually proceeds deeply into the narrow gap portion, and is convergent to a point near the apex of the narrow gap portion. As a result, the surface of the face sheet 3 and the surface of the flange 30, which are disposed in the vicinity of this laser beam convergent portion, are fused and welded together. Rolls 60 and 60a serving as drive rolls withdraw the core and the panel at the same time at a speed V. The withdrawing speed is determined by the width of the panel, the output of the laser beam and the thickness of the thinner portion (for example, the thickness of the flange) of the welded portions.

As described above, the present invention provides the core strip for the honeycomb panel and the method of producing the same, as well as the technique of producing the panel. In the present invention, the wrinkling resulting from the punch-shaping step of the conventional method is not produced, and the overlapping of the flanges as well as the welding between the flanges is not required, such that the welding between the core strips can be carried out at high speed in a stable manner. As a result, the core material of a sufficient thickness can be used. Further, the width of the flanges needed for bonding the face sheet to the core strip can be increased, and the flanges provide the flat surface. Therefore, the welding between the face sheet and the core strips is uniform and flawless, thereby greatly increasing the strength of the honeycomb panel.

What is claimed is:

1. A core strip for a honeycomb core panel, comprising:
    a metal strip formed into a corrugated configuration and having continuous alternate convex and concave portions of substantially identical shape, each of said convex portions being defined by a plateau portion and a pair of inclined portions, each of said concave portions being defined by a bottom portion and said pair of inclined portions, each of said inclined portions interconnecting said plateau portion and said bottom portion;
    plurality of first flanges provided along the edge of said metal strip in the direction of the width of said metal strip, said first flanges being located only on said plateau portions, and said inclined portions disposed respectively on opposite sides of each said plateau portion, said first flanges being disposed perpendicular to said metal strip and directed away from a convex surface of said convex portion; and
    plurality of second flanges provided along the opposite edge of said metal strip in the direction of the width of said metal strip, said second flanges being located only on said bottom portions and said inclined portions disposed respectively on opposite sides of each said bottom portion, said second flanges being disposed perpendicular to said metal strip and directed away from a convex surface of said concave portion and therefore in a direction opposite to said first flanges.

2. A method of producing the core strip for a honeycomb core panel comprising the steps of:
    providing a metal strip having opposite edges in the direction of its width;
    forming notches in each of the opposite side edges of said metal strip;
    bending flanges, formed on the opposite side edges of said metal strip as a result of the formation of said notches, in opposite directions and perpendicularly with respect to said metal strip; and
    shaping said metal strip into a corrugated configuration having continuous alternate convex and concave portions of substantially identical shape, each of said convex portions being defined by a plateau portion and a pair of inclined portions, each of said concave portions being defined by a bottom portion and said pair of inclined portions, each of said inclined portions interconnecting said plateau portion and said bottom portion, said flanges defining a plurality of first and second flanges, said first flanges provided along one edge in the direction of the width of said metal strip, said first flanges being located only on said plateau portion and said inclined portions disposed respectively on opposite sides of said plateau portion, said first flanges being disposed perpendicular to said metal strip and directed away from a convex surface of said convex portion; and said second flanges provided along the opposite edge in the direction of the width of said metal strip, said second flanges being located only on said bottom portion and said inclined portions disposed respectively on opposite sides of said bottom portion, said second flanges being disposed perpendicular to said metal strip and directed away from a convex surface of said concave portion and therefore in a direction opposite to said first flanges.

3. A method of producing a honeycomb core comprising the steps of:
    forming at least two core strips each including a metal strip formed into a corrugated configuration and having continuous alternate convex and concave portions of substantially identical shape, each of said convex portions being defined by a plateau portion of a pair of inclined portions, each of said concave portions being defined by a bottom portion and said pair of inclined portions, each of said inclined portions interconnecting said plateau portion and said bottom portion; and having a plurality of first flanges provided along one edge in the direction of the width of said metal strip, said first flanges being located only on said plateau portion and said inclined portions disposed respectively on opposite sides of said plateau portion, said first flanges being disposed perpendicular to said metal strip and directed away from a convex surface of said concave portion and therefore in a direction opposite to said first flanges;
    overlapping bottom portions of one of said at least two core strips with plateau portions of said other core strip, respectively;
    inserting an upper fixing jig into overlapped core strips along overlapped surface thereof, having no flange, from one sides of the overlapped core strips, said upper fixing jig pressing said overlapped portion from an upper side;
    inserting a lower fixing jig into the overlapped core strips along the overlapped surface thereof, having no flange, from other sides of the overlapped core strips, said lower fixing jig pressing said overlapped portion from a lower side;
    clamping and pressing said overlapped portions between said upper and lower fixing jigs; and
    welding the bottom portions of said one core strip to the plateau portions of said other core strip, respectively, thereby forming the honeycomb core.

4. A method of producing a honeycomb core panel using the honeycomb core as claimed in claim 3, further comprising the steps of:
    feeding a pair of face sheets to the opposite sides of the honeycomb core, respectively;
    forming a V-shaped narrow gap portion between the flange of the core strip and said face sheet; and
    applying a laser beam to said narrow gap portion so as to cause said laser beam to be subjected to multiple reflection, thereby converging said laser beam to a closed end of said narrow gap portion remote from its open end, so that said face sheet is bonded to said flange of said core strip by said convergent laser beam.

* * * * *